United States Patent [19]

Geyken

[11] 4,392,177
[45] Jul. 5, 1983

[54] TRANSPORTING ROLLER FOR WEBS OF PHOTOSENSITIVE MATERIAL OR THE LIKE

[75] Inventor: Erwin Geyken, Neubiberg, Fed. Rep. of Germany

[73] Assignee: Agfa-Gevaert Aktiengesellschaft, Leverkusen, Fed. Rep. of Germany

[21] Appl. No.: 189,826

[22] Filed: Sep. 23, 1980

[30] Foreign Application Priority Data

Sep. 28, 1979 [DE] Fed. Rep. of Germany ....... 2939473

[51] Int. Cl.³ .............................................. H05F 1/00
[52] U.S. Cl. .................................................... 361/221
[58] Field of Search ........................ 361/212, 214, 221

[56] References Cited

U.S. PATENT DOCUMENTS

| 2,353,462 | 7/1944 | Harkins | 361/221 X |
| 2,996,646 | 8/1961 | Wilson | 361/221 |
| 3,268,766 | 8/1966 | Amos | 361/221 |
| 3,308,045 | 3/1967 | Sullivan | 361/221 X |
| 3,611,028 | 10/1971 | Whitmore | 361/221 |
| 3,936,170 | 2/1976 | Shibano et al. | 361/221 |
| 4,049,343 | 9/1977 | Hermanson | 361/221 |

FOREIGN PATENT DOCUMENTS 2124837  9/1979  Fed. Rep. of Germany ...... 361/212

OTHER PUBLICATIONS

R. Traviesco, "Electroconductive Polymers...," IBM Tech. Disclosure Bulletin, vol. 19, No. 7, Dec. 1976.

Primary Examiner—A. D. Pellinen
Assistant Examiner—L. Schroeder
Attorney, Agent, or Firm—Kontler, Grimes & Battersby

[57] ABSTRACT

A roller for transport and/or guidance of flexible webs or sheets of radiation-sensitive material has a grounded shaft and an antistatic cylindrical member which is coaxial with and surrounds the shaft and has a web- or sheet-contacting cylindrical peripheral surface. The cylindrical member consists of hard polyvinyl chloride, fine crystalline polyamide, polypropylene, polyethylene or a mixture of two or more such plastic materials. Pulverized silver or another pulverulent metal is embedded in the material of the cylindrical member. If the roller is rather long, the cylindrical member surrounds a hollow cylindrical metallic core whose end portions confine inserts which surround the respective end portions of the shaft.

22 Claims, 4 Drawing Figures

TRANSPORTING ROLLER FOR WEBS OF PHOTOSENSITIVE MATERIAL OR THE LIKE

BACKGROUND OF THE INVENTION

The present invention relates to devices for transporting and/or guiding flexible commodities, especially flexible radiation-sensitive articles including X-ray films which are to be transported and/or guided in the dry region of a processing machine. More particularly, the invention relates to improvements in transporting and/or guiding devices of the type wherein a shaft is surrounded by a cylindrical member which consists of synthetic plastic material and confines an antistatic additive.

A machine which processes photosensitive and other radiation-sensitive material normally comprises one or more sections wherein sheets or webs of flexible radiation-sensitive material must be transported in dry condition. Examples of such machines are copying, enlarging and developing machines which include one or more sections wherein photographic paper or other photosensitive material must be transported in non-wetted condition prior to development of latent images. This applies for inlet regions of developing machines where the exposed but yet to be developed film or photographic paper advances on its way toward the first of a series of liquid-containing vessels, as well as for apparatus which introduce X-ray film into or remove X-ray film from cassettes or analogous containers. A similar situation arises in X-ray machines wherein relatively large or relatively small loose sheets of radiation-sensitive material must be withdrawn from their cassettes or magazines, transported to a position of register with a source of X-rays, and thereupon advanced from such source to the developing station.

If the article-contacting surfaces of the transporting and/or guiding devices (normally in the form of rollers) are the exposed surfaces or cylindrical or otherwise configurated members which consist of synthetic plastic material, the members are highly likely to become electrostatically charged so that a discharge of accumulated electrostatic potential takes place on contact with the web of photosensitive material. This results in an imaging of the discharge and attendant damage to or total loss of utility of the photosensitive material. Such discharge is especially undesirable when the material to be transported and/or guided already carries one or more latent images which are about to be developed, e.g., latent images which represent portions of a human body and are about to be developed for study by physicians and/or other qualified persons.

Attempts to prevent such discharges include the use of rollers whose article-contacting portions consist of high-quality steel and which are installed in the dry regions or sections of machines for developing, inserting, removing and/or otherwise processing webs, sheets or strips of radiation-sensitive material. A drawback of such conventional rollers is their high cost and pronounced weight; this drawback is particularly serious when the dry section of a machine requires a substantial number of rollers or analogous article-guiding and/or transporting devices.

Other prior proposals include the utilization of so-called antiflash rubber rollers. The cylindrical mantles of such rollers consist of rubber and the elastomeric material confines an antistatic component which is intended to reduce the extent of electrostatic charging. A drawback of such prior proposal is that rubber rollers are not suited for a variety of uses in machines for the processing of radiation-sensitive material. For example, the ability of rubber rollers to transport films along relatively short paths which exhibit a highly pronounced curvature is extremely limited. Moreover, the useful life of rubber rollers is relatively short and their ability to withstand corrosive influences in many types of film processing machines is either insufficient or negligible.

U.S. Pat. No. 3,611,028 granted Oct. 5, 1971 to Whitmore discloses a roller whose cylindrical article-contacting portion consists of elastomeric synthetic plastic material embodying an antistatic agent. The patentee proposes to employ a vinyl chloride resin which is mixed with alkyl phthalyl alkyl glycolate. Tests with such rollers indicate that the extent of electrostatic charging is reduced so that the rollers can be used for the transport and/or guidance of certain types of photosensitive material. However, their resistance to acceptance of an electrostatic charge does not suffice to warrent or justify their use in connection with the transport and/or guidance of X-ray film or the like.

OBJECTS AND SUMMARY OF THE INVENTION

An object of the invention is to provide a novel and improved device which can be used to transport and/or guide webs, sheets or strips of flexible radiation-sensitive material and whose antistatic properties are more satisfactory than those of heretofore known devices.

Another object of the invention is to provide a roller or an analogous web transporting and/or guiding device which is not only unlikely to accumulate substantial electrostatic charges but is not even capable of accumulating relatively small or minute electrostatic charges so that the likelihood of discharge of electrostatic potential on contact with radiation-sensitive articles is practically nil.

A further object of the invention is to provide a simple, lightweight and inexpensive rotary web-, sheet- or strip-guiding and/or transporting device which can be used in a wide variety of machines for the processing of radiation-sensitive material as a superior substitute for heretofore known and/or utilized devices.

An additional object of the invention is to provide a roller with a novel and improved article-contacting member which is incapable of accumulating and/or storing appreciable electrostatic charges.

Still another object of the invention is to provide novel and improved means for securing portions of a composite shaft to the article-contacting member of a roller which exhibits the above outlined features.

Another object of the invention is to provide a roller which can be manufactured in any desired practical size and/or shape for the transport of relatively wide, relatively narrow, continuous or discontinuous articles of sensitive material such as webs or sheets of X-ray film or the like.

A further object of the invention is to provide a novel and improved method of making and assembling the constituents of the above outlined device.

One feature of the invention resides in the provision of a device (particularly a rotary device) for guidance and/or transport of flexible radiation-sensitive articles, particularly for transport of X-ray films in the dry region or section of a processing machine. The device comprises a composite or one-piece shaft having first and second end portions, and a cylindrical article-contacting member which coaxially surrounds the shaft so that at least one end portion of the shaft remains exposed. The cylindrical member consists of synthetic plastic material and a pulverulent or pulverized metallic material which is embedded in the plastic material to reduce or eliminate the tendency of the cylindrical member to accumulate an electrostatic charge. The metallic material is preferably silver. At least that end portion of the shaft which remains exposed preferably consists of electrically conductive material and is in conductive contact with the cylindrical member; such end portion of the shaft is then grounded.

The synthetic plastic material is preferably selected from the group consisting of hard polyvinyl chloride, fine crystalline polyamide, polypropylene, polyethylene and a mixture of two or more of these materials.

The novel features which are considered as characteristic of the invention are set forth in particular in the appended claims. The improved device itself, however, both as to its construction and the mode of making the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
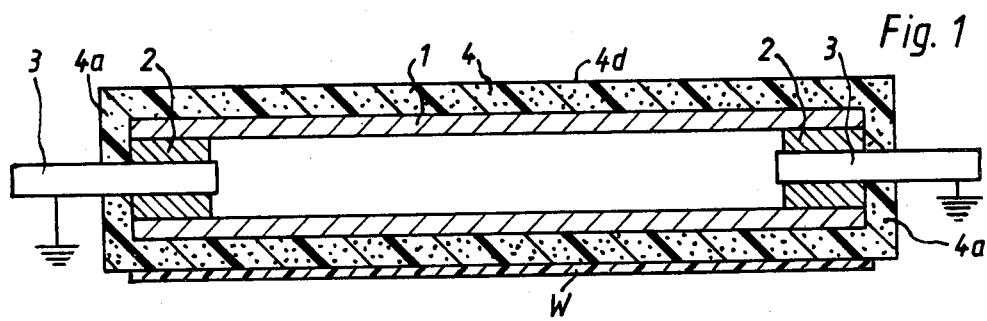
FIG. 1 is an axial sectional view of a device which embodies one form of the invention and comprises a composite shaft.

FIG. 1 shows a roller-shaped rotary device which serves for transport and/or guidance of flexible webs W of radiation-sensitive material, e.g., of webs which constitute X-ray films. The rotary device of FIG. 1 comprises a hollow cylindrical core 1 which is closed and sealed at both ends by discrete cylindrical plugs or stoppers 2. These stoppers are sealingly traversed by coaxial portions or stubs 3 of a composite shaft. The manner in which the exposed outer portions of the stubs 3 are journalled in the frame of a developing, winding or unwinding machine is not specifically shown in the drawing. The stubs 3 preferably consist of high-quality stainless steel and are grounded. The rotary device further comprises a hollow cylindrical member 4 which consists of synthetic plastic material and completely surrounds and closely hugs the external surface of the core 1, the end faces of the core, and the outer end faces of the plugs 2. Furthermore, the end portions 4a of the cylindrical member 4 are in sealing contact with the adjacent portions of the stubs 3 so that the interior of the core 1 is completely sealed from the surrounding atmosphere. The thickness of the cylindrical member 4, as considered in the radial direction of the rotary device, exceeds the thickness of the core 1. The thickness of the end portions 4a may equal or approximate the thickness of the cylindrical portion of the member 4. The article-contacting peripheral surface of the cylindrical member 4 is shown at 4d.

The material of the cylindrical member 4 is preferably hard polyvinyl chloride, finely crystallized polyamide, polypropylene, polyethylene or a mixture of two or more of the just enumerated substances. In accordance with a feature of the invention, the synthetic plastic material of the cylindrical member 4 contains embedded particles of a pulverulent or pulverized metallic material, preferably pulverized silver. This ensures that the surface resistance of the cylindrical member 4 is less than $1 \times 10^9$ ohms (when measured in accordance with the German DIN norm No. 53482).

Figure 2:
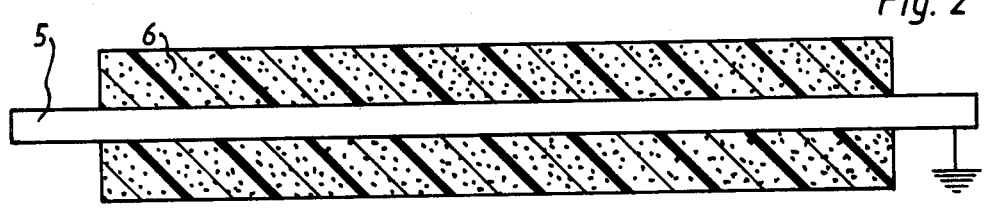
FIG. 2 is an axial sectional view of a second device with a one-piece shaft.

FIG. 2 shows a modified roller-shaped rotary device which can be used in the same way as the rotary device of FIG. 1. The device of FIG. 2 comprises an uninterrupted (one-piece) grounded shaft 5 which is surrounded by a relatively thick hollow cylindrical member 6 so that both end portions of the shaft 5 remain exposed for convenient mounting in the frame of a processing machine, not shown. The rotary device of FIG. 2 (the same as the device of FIG. 1) can be driven by a running web or can transmit motion to a web, sheet or strip of radiation-sensitive material. The material of the cylindrical member 6 is preferably the same as that of the cylindrical member 4, i.e., it is a synthetic plastic substance which contains embedded metallic particles, preferably particles of pulverized silver.

Figure 3:
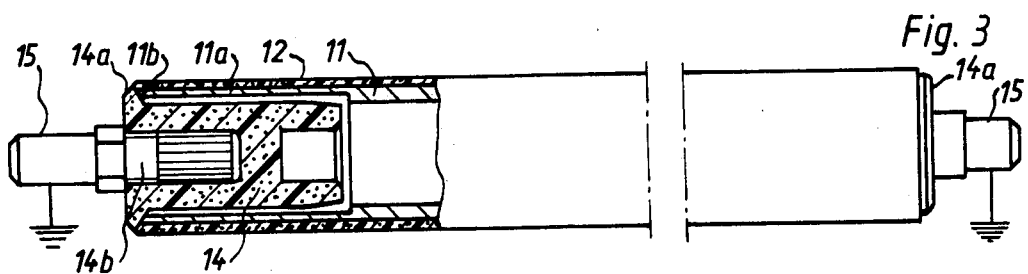
FIG. 3 is a fragmentary partly elevational and partly axial sectional view of a third device.
Figure 4:
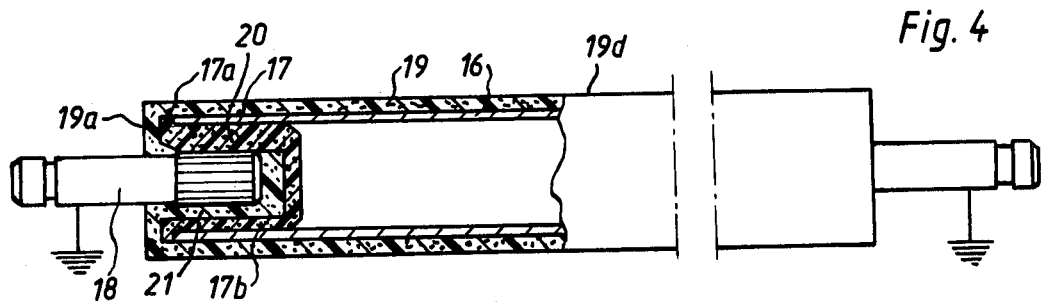
FIG. 4 is a similar fragmentary partly elevational and partly axial sectional view of a fourth device which constitutes a modification of the device shown in FIG. 3.

FIGS. 3 and 4 illustrate rotary devices which are characterized by high resistance to corrosion and are exceptionally stable as to form so that they can constitute very long rollers having diameters which are but a small fraction of the length of their cylindrical members. The devices of FIGS. 3 and 4 can be used with advantage for the transport of flexible sheets, webs or strips of photosensitive or other material.

Referring to FIG. 3, there is illustrated a rotary device having an elongated hollow cylindrical core 11 of metallic material, such as aluminum, or another metallic or non-metallic substance which need not exhibit a high resistance to corrosion, e.g., to the corrosive action of fluids which are used in photographic developing or like machines. All that counts is to ensure that the material of the core 11 can be readily and satisfactorily bonded to synthetic thermoplastic material, namely, to the material of the hollow cylindrical member 12 which sealingly surrounds the core 11. The material of the cylindrical member 12 is preferably the same as that of the cylindrical member 4 shown in FIG. 1. Also, the material of the member 12 embodies embedded particles of a metallic material, preferably pulverized silver.

The end portions 11a of the metallic core 11 have enlarged inner diameters which slightly exceed the outer diameters of plastic inserts 14 each of which surrounds and is bonded to a stub 15 of high-quality (stainless) steel. These stubs constitute a composite (two-piece) shaft of the rotary device, and a portion of each stub 15 is exposed for installation in a machine frame, not shown. The material of the inserts 14 is preferably identical with that of the cylindrical member 12. Each insert 14 has a radially outwardly extending circumferentially complete collar 14a which abuts only against the respective end face of the cylindrical member 12. To this end, the end faces 11b of the core 11 are chamfered (e.g., during the machining of the larger-diameter bores into the end portions 11a). The parts 14 are bonded to the respective end portions of the cylindrical member 12 by any one of a large variety of commercially available adhesives which ensure the establishment of a corrosion-resistant and fluidtight connection of requisite mechanical strength. The number of suitable adhesives is especially large if the material of the cylindrical member 12 is identical to that of the inserts 14.

The inner portion of each stub 15 is provided with axially parallel flutes or grooves alternating with ridges or ribs. Such inner portions extend into axial bores 14b in the outer end faces of the corresponding inserts 14. The connections between the grooved portions of the stubs 15 and the corresponding inserts 14 can be established by resorting to a suitable adhesive (i.e., by bonding), by injection molding or casting the inserts 14 around the inner portions of the respective stubs 15, or by so-called sonic or ultrasonic bonding. The last mentioned technique involves imparting to the stubs 15 a vibratory movement having a frequency which is at least in the sonic range (while the stubs 15 are introduced into the corresponding inserts). The vibratory movements cause heating of the material of the inserts 14 immediately adjacent to the peripheral surfaces of the inner portions of the stubs 15. At the same time, the inserts 14 are in pronounced frictional engagement with the stubs 15. All this leads to liquefaction of the corresponding portions of the inserts 14 which facilitates the insertion of the stubs 15 into the bores 14b and results in the establishment of strong and fluidtight bonds as soon as the liquefied material of the inserts 14 is allowed to set. It has been found that sonic or ultrasonic bonding can establish highly reliable connections between metallic and plastic components.

The rotary device of FIG. 4 has a hollow cylindrical metallic core 16 which is surrounded by a thicker hollow cylindrical member 19 made of a material which is preferably identical to that of the members 4, 6 and 12. The core 16 can be made of aluminum and its end portions surround plastic inserts 17 each of which, in turn, surrounds a grounded stub 18 of stainless steel or the like. The means for determining the axial positions of the inserts 17 with reference to the core 16 and the cylindrical member 19 include collars 17a which extend radially outwardly and abut against the respective end faces of the core 16. The means for centering the inserts 17 in the parts 16, 19 include the cylindrical peripheral surfaces 17b which contact the end portions of the internal surface of the core 16. The material of the inserts 17 is preferably (but need not always be) identical with that of the cylindrical member 19.

The manner of embedding the inner portions of the stubs 18 in the corresponding inserts 17 is somewhat different from the mode of introducing the stubs 15 of FIG. 3 into the associated inserts 14. This is due to the fact that the diameters of the axial bores in the inserts 17 exceed the diameters of the inner portions of the stubs 18. Each insert 17 has several (e.g., four) equidistant internal distancing projections or ribs 20 which are parallel to the axes of the stubs 18 and contact the peripheral surfaces of the inner portions of the respective stubs. Such construction allows for some elastic deformation of the inserts 17, e.g., if the inner diameter of the core 16 is smaller than the outer diameters of the undeformed inserts (i.e., if it is necessary to introduce the inserts 17 with a force which entails at least some deformation of the inserts). Snug fits of the inserts 17 in the end portions of the core 16 are desirable if the internal surface of the core is not machined with a high degree of precision (or is not machined at all) in order to save time and/or expenses.

Once the stubs 18 are assembled with the inserts 17 and the inserts 17 are introduced into the respective end portions of the core 16, the thus obtained partially finished or assembled device is inserted into the cavity of a suitably configured mold in an injection molding or casting machine, not shown. The mode of insertion of the partly assembled device into the mold is such that the surface surrounding the cavity is spaced apart from the peripheral surface of the core 16 as well as from the outer end faces of the inserts 17. This leaves room for introduction of plasticized synthetic plastic material which is converted into the cylindrical member 19. It is clear that the mold has sockets for the exposed portions of the stubs 18 and one or more holes for admission of plasticized material. The holes are preferably adjacent to the outer end faces of the inserts 17. The mold is assembled of several separable sections (e.g., of two semicylindrical halves or shells) to allow for convenient withdrawal of the finished rotary device. An especially suitable material for injection molding of the cylindrical member 19 is hard polyvinyl chloride. Such material can be admitted in a single step to form the cylindrical portion as well as the end portions 19a of the member 19. Moreover, the plasticized material penetrates into and forms fillers 21 in the spaces between the internal ribs 20 of the inserts 17 so that each insert is securely connected to the associated stub 18 and the interior of the core 16 is sealed from the surrounding atmosphere. Also, the end portions 19a of the member 19 sealingly contact the stubs 18 axially outwardly of the inserts 17. The thus obtained rotary device can be subjected to one or more secondary treatments, e.g., to one or more turning or milling operations for enhancing the smoothness of the article-contacting cylindrical peripheral surface 19d of the member 19. Such operation or operations can be carried out in a machine wherein the rotary device is installed by way of its stubs and is rotated relative to one or more material removing tools and/or vice versa.

Smooth finishing of the external surface of the cylindrical members 4, 6, 12 and 19 is desirable in many instances. Devices embodying such cylindrical members are superior to rubber rollers because the exposed surface of a precision-finished cylindrical member (which consists of the material referred to in connection with the member 4 of FIG. 1) is highly unlikely to accumulate remnants of gelatine. Removal of such remnants from the surfaces of rubber rollers presents many problems. Moreover, the exposed surfaces of members 4, 6, 12 and 19 are not likely to be scarred by sharp leaders or marginal portions of photographic films, X-ray films or the like, e.g., when the films are transported by or impart motion to the cylindrical members. Thus, the wear upon the improved rotary device is negligible or very low so that such device can stand long periods of intermittent or continuous use.

The metallic cores 11 and 16 enhance the resistance to deformation of the rotary devices shown in FIGS. 3 and 4, even under circumstances which are highly conducive to bending, twisting and/or other types of deformation. On the other hand, the cylindrical members 12 and 19 offer high resistance to corrosion and protect the cores 11 and 16 from contact with acids or other corrosive substances. Since the inserts 17 are fully confined in the cylindrical member 19 of the rotary device shown in FIG. 4, this embodiment is capable of preventing the penetration of fluids into the core 16 even after many years of intermittent or continuous use.

The cylindrical member 4, 6, 12 or 19 can be secured to the respective shaft, core and/or inserts by casting, bonding, injection molding, extrusion, shrinkage or any other suitable technique. The same holds true for connections between the shafts and the inserts and/or between the inserts and the core.

An important advantage of the improved device is that the surface resistance of the cylindrical member is less than $1 \times 10^{10}$ ohms. This ensures that photosensitive material can be transported without any flashing. Moreover, the manufacturing cost (when compared with rollers which are made of rubber or steel) is surprisingly low. Still further, the user can take advantage of many important and desirable features of synthetic plastic material such as long useful life, a minimum of wear, low weight, resistance to corrosive action of many chemicals, convenience of cleaning and other maintenance, and relatively low friction coefficient of the exposed surface of the cylindrical member to ensure reliable transport and/or guidance of articles constituting webs, strips, sheets or the like.

The method of sonic or ultrasonic bonding which can be resorted to in assembling the rotary device of the present invention is disclosed, for example, in the book "Konstruieren mit PUR-Integralhartschaum" by Georg Klepek, Hansa-Verlag, Munich.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A device for the guidance and/or transport of flexible radiation-sensitive articles, particularly for the transport of x-ray films in the dry region of a processing machine, comprising a shaft having first and second end portions comprising electrically conductive materials; and a cylindrical article-contacting member coaxially surrounding said shaft so that at least one of said end portions remains exposed, said member comprising a synthetic plastic material selected from the group consisting of hard polyvinyl chloride, fine crystalline polyamides, polypropylene, polyethylene and mixtures thereof, said member being connected with ground and further comprising pulverulent silver which is embedded in said plastic material to thereby rapidly disperse electrostatic charges and prevent discharges which generate light detrimental to radiation-sensitive articles, said member being in conductive contact with said end portions and the quantity of silver in said plastic material being such that said member has a surface resistance of at least about $1 \times 10^{10}$ ohms.

2. The device of claim 1, wherein said one end portion of said shaft is grounded.

3. The device of claim 1, wherein said shaft is a one-piece component and is in contact with said cylindrical member.

4. The device of claim 1, further comprising a tubular core interposed between and coaxial with said shaft and said cylindrical member.

5. The device of claim 4, wherein said cylindrical member is extruded onto said core.

6. The device of claim 4, wherein said cylindrical member comprises a casting which is in intimate contact with said tubular core.

7. The device of claim 4, wherein said cylindrical member comprises an injection molded body which is in intimate contact with said tubular core.

8. The device of claim 1, wherein said cylindrical member is extruded onto said shaft.

9. The device of claim 1, wherein said cylindrical member comprises an injection molded body which is in intimate contact with said shaft.

10. The device of claim 1, wherein said cylindrical member comprises a casting which is in intimate contact with said shaft.

11. The device of claim 1, wherein said cylindrical member comprises a hollow tubular body having a substantial wall thickness as considered in the radial direction of said shaft.

12. The device of claim 1, wherein said shaft comprises two spaced-apart coaxial stubs which constitute said end portions; and further comprising tubular inserts interposed between said stubs and said cylindrical member.

13. The device of claim 12, wherein said cylindrical member has first and second end portions and said inserts are surrounded by said end portions of said cylindrical member.

14. The device of claim 13, wherein said cylindrical member is hollow and said inserts include portions which seal the interior of said cylindrical member from the surrounding atmosphere.

15. The device of claim 12, wherein said inserts comprises a synthetic plastic material.

16. The device of claim 12, wherein said inserts are sealingly bonded to said cylindrical member.

17. The device of claim 12, wherein said stubs are bonded to the respective inserts.

18. The device of claim 12, wherein said inserts are injection molded on the respective stubs.

19. The device of claim 12, wherein said inserts are sonically or ultrasonically bonded to the respective stubs.

20. The device of claim 12, comprising distancing elements between said inserts and said stubs, said distancing elements defining spaces with said stubs and said inserts; and further comprising fillers disposed in and sealing said spaces.

21. The device of claim 20, wherein said fillers form integral parts of said cylindrical member.

22. The device of claim 21, wherein said cylindrical member is an injection molded body and said fillers are formed in the course of molding said cylindrical member.

* * * * *